March 31, 1942.
W. C. HANSEN
2,277,755
LICENSE PLATE BRACKET MOUNTING
Filed April 20, 1940
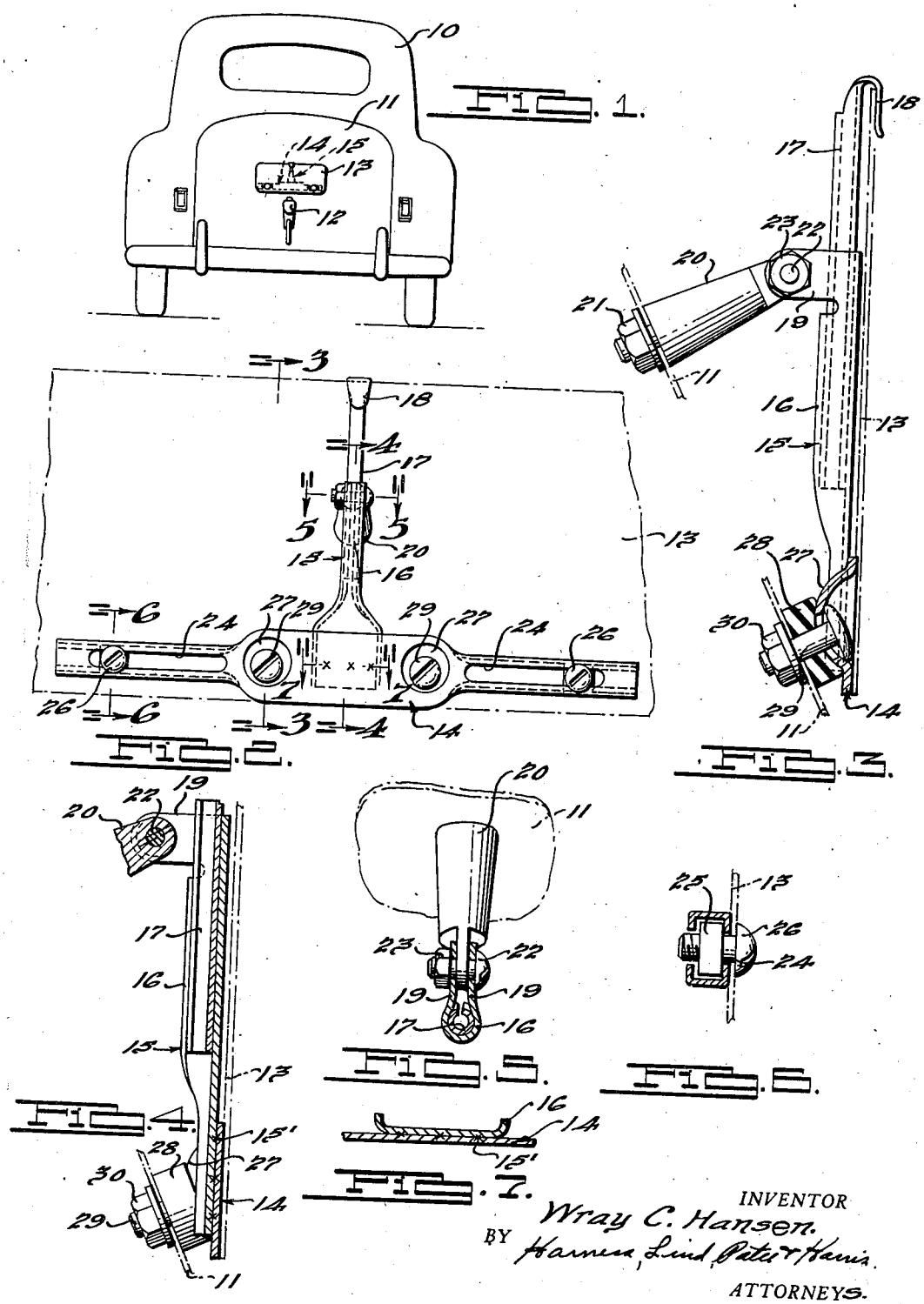
INVENTOR
Wray C. Hansen.
BY
ATTORNEYS.

Patented Mar. 31, 1942

2,277,755

UNITED STATES PATENT OFFICE 2,277,755

LICENSE PLATE BRACKET MOUNTING

Wray C. Hansen, Highland Park, Mich., assignor to Chrysler Corporation, Highland Park, Mich., a corporation of Delaware Application April 20, 1940, Serial No. 330,659

7 Claims. (Cl. 40—125)

This invention relates to improvements in the mounting of an identification plate on a motor vehicle.

It is necessary that the identification or license plate at the rear of the vehicle be so arranged that it can be properly illuminated by an adjacently disposed lamp and it is common practice to arrange the plate in a substantially vertical position, although tilting thereof within predetermined limits from this position is permissible. In order to comply with the various requirements relating to the disposition of the license plate, it has been necessary to provide mounting parts for each type of vehicle body due to the variations in the contours of the various body types; that is to say mounting parts which would maintain the plate in the prescribed position for a coupé type body would not so function when applied to a sedan type body.

It is therefore an object of the invention to provide an improved mounting for the license or identification plate which is so adjustable as to be used with various types of bodies having diverse contours; and to provide a mounting which would accommodate tilting of the plate so that the angle at which the latter is supported can be varied to accommodate mounting on different types of bodies having diverse contours.

Another object of the invention is to provide improved means for attaching the identification plate and support therefor to a vehicle body whereby relatively adjustable mounting parts are retained in adjusted position.

Another object of the invention is to provide an improved mounting representing a simplification and reduction in the number of parts required for mounting identification plates on various types of vehicle bodies.

Other objects and advantages of the invention will be more apparent from the following description taken in connection with the accompanying drawing, in which:

Fig. 1 is an elevational view of the rear portion of a vehicle body having an identification plate mounted thereon according to the invention.

Fig. 2 is an enlarged fragmentary side elevational view of the plate and mounting support therefor shown in Fig. 1.

Fig. 3 is an enlarged transverse view, partly in section, taken as indicated by the line 3—3 in Fig. 2.

Fig. 4 is a transverse view, partly in section taken as indicated by the line 4—4 of Fig. 2.

Fig. 5 is a horizontal sectional view taken on the line 5—5 of Fig. 2.

Fig. 6 is a transverse sectional view taken on the line 6—6 of Fig. 2.

Fig. 7 is a section taken on line 7—7 of Fig. 2.

The invention is illustrated and described in connection with a motor vehicle 10 having a portion thereof indicated at 11, in this instance a swingably mounted closure member, to which is secured a lamp 12. Disposed immediately above the latter for illumination thereby is an identification plate 13. It is desirable that the plate 13 be disposed in a substantially vertical position, although requirements in this respect permit tilting thereof within prescribed limits from the latter position.

The identification plate 13 is detachably secured to a support including a horizontally disposed part 14 and a vertically disposed part 15, these parts preferably being separately formed and welded together as indicated at 15' in Figs. 4 and 7. The part 15 includes a pair of telescoping members 16 and 17, the latter being adjustable vertically and having a reversely bent upper end providing a flange 18, the upper edge of the plate 13 being disposed between the body of the member 17 and the flange 18 thereof. The member 16 slidably receives the member 17 and has a pair of spaced parallel arranged tabs 19 which, upon being drawn together as hereinafter set forth, cause the member 16 to frictionally engage the member 17 for maintaining the adjusted height of the support part 15.

A connector 20 extends between the body part 11 and the upright support part 15 and has a reduced end portion extending through an opening in the body for threadedly receiving a securing nut 21, the opposite end of the connector 20 extending between the tabs 19 for attachment thereto by a bolt 22 passing through registering apertures in the tabs and connector end portions. A nut 23 is threaded onto the bolt 22 and draws the tabs 19 together, thereby causing the member 16 to frictionally engage the member 17 for maintaining the adjusted height of the part 15. This connection can accommodate pivotal movement of the plate support relative to the connector 20.

A horizontally disposed part 14 has opposite channel shaped end portions, the free end of each channel leg being flanged, one toward the other, as is more particularly shown in Fig. 6, and each of these end portions is provided with an enlongated slot 24 registering with an aperture of a square-headed nut member 25 therein.

Each of the latter receives a securing bolt 26 fastened through an opening in the plate 13 for detachably securing the latter to the part 14. Each channel-shaped end portion cooperates with the square-headed nut member 25 therein to retain the latter against rotation when the bolt 25 is threaded with respect thereto.

As heretofore pointed out, it is desirable and necessary that the plate 13 be maintained in a substantially vertical position with a permissible inclination or tilting thereof, within prescribed limits, from the latter position and to accomplish this it is necessary to provide a connection between the support for the plate and the vehicle body which will accommodate such inclination or tilting of the plate. In the illustrated embodiment of the invention the inclination or tilting aforesaid is accomplished through the connection between the horizontal part 14 and the vehicle body 11. The section of the part 14 intermediate the parts 24 thereof is embossed to provide spaced spherical-like protuberances 27 on the face thereof adjacent the vehicle body and corresponding recesses in the opposite face. Interposed between each protuberance 27 and the vehicle body 11 is a washer 28, preferably of rubber or a material having the characteristics of the latter, each washer having a seat provided with a contour corresponding to the contour of and receiving a protuberance 27 therein. Aligned apertures are provided in the associated protuberances and washers and a bolt 29 extends through these apertures and an aperture in the vehicle body and is secured to the later by a nut member 30, this arrangement also securing the protuberance and washer in the adjusted relation. The aperture of each protuberance 27 has a diameter larger than the diameter of the bolt to permit relative adjustment between the associated protuberance and washer 28. The latter is maintained under pressure between the associated protuberance and body surface 11 and acts to seal the opening in the latter.

The connection between the horizontal part 14 and the vehicle body accommodates tilting of the plate 13 toward and away from the vehicle body where such is necessary due to variations in the contours of the different types of bodies, thereby eliminating the necessity of providing individual mounting parts for each type of vehicle body where the contours thereof may vary.

Although but one embodiment of the invention is herein shown and described, it will be understood that various changes in the size, shape and arrangement of parts may be made without departing from the spirit of my invention, and it is not my intention to limit said invention other than by the terms of the appended claims.

What I claim is:

1. In a device for mounting an identification plate on a vehicle body portion having a radius of curvature; a support for the plate including a vertically disposed member and a horizontally disposed member relatively rigid therewith, means adapted to connect said vertically disposed member with said body portion and predetermine the relative angular relationship of said plate and body portion, and means adapted to form a connection between said horizontal member and said body including relatively movable parts having abutting complementary arcuate surfaces accommodating tilting of said support and plate to the relatively angular relation as predetermined by said connecting means.

2. In a device for mounting an identification plate on a vehicle body portion having a radius of curvature; a support for the plate including a vertically disposed member and a horizontally disposed member relatively rigid therewith, means adapted to connect said vertically disposed member with said body portion and predetermine the relative angular relationship of said plate and body portion, and means adapted to form a connection between said horizontal member and said body accommodating tilting of said support and plate to the relatively angular relation as predetermined by said connecting means, said connection including a protuberance having an arcuate surface carried by said horizontally disposed member and a washer between said protuberance and said body having an arcuate face seating said protuberance.

3. In a device for mounting an identification plate on a vehicle body portion having a radius of curvature; a support for the plate including a vertically disposed member and a horizontally disposed member relatively rigid therewith, means adapted to connect said vertically disposed member with said body portion and predetermine the relative angular relationship of said plate and body portion, and means adapted to form a connection between said horizontal member and said body for accommodating tilting of said support and plate to the relatively angular relation as predetermined by said connecting means, said connection including a boss carried by said horizontal member and a washer of rubber-like material having a seat for said boss.

4. In a device for mounting an identification plate on a vehicle body portion having a radius of curvature; a support for the plate including a vertically disposed member and a horizontally disposed member relatively rigid therewith, means adapted to connect said vertically disposed member with said body portion and predetermine the relative angular relationship of said plate and body portion, and means adapted to form a connection between said horizontal member and said body for accommodating tilting of said support and plate to the relatively angular relation as predetermined by said connecting means, said connection including a boss carried by said horizontal member and a washer of rubber-like material having a seat for said boss, said boss, washer and body having aligned apertures, and a bolt-like element extending through said apertures adapted to secure said horizontal member to the vehicle body.

5. In a device for mounting an identification plate on a vehicle body; a support for the plate including a vertically disposed part and a horizotally disposed part relatively rigid therewith, said vertically disposed part including adjustable telescoping elements adapted to be retained in adjusted position by relative frictional engagement therebetween, one of said elements having spaced tabs adapted to be drawn one toward the other to effect said frictional engagement, a member adapted to form a connection between the vehicle body and said vertically disposed part secured to said tabs, and means securing said member to said tabs operable to draw the latter one toward the other for effecting said frictional engagement.

6. In a device for mounting an identification plate on a vehicle part, a support for the plate, a member adapted to be secured to the vehicle part for spacing the support from the latter and having a pivotal connection with said support accommodating pivotal movement thereof, and means adapted to form a connection between the vehicle part and support including a washer member and a boss member having abutting arcuate surfaces, said members having registering apertures, and means extending through said apertures adapted to secure said support to the vehicle part.

7. In a device for securing a license plate to a vehicle part having an aperture, a support structure for the plate, a member adapted to be secured to the vehicle part for spacing said structure therefrom and having a pivotal connection with said structure, an apertured boss carried by said structure having an arcuate surface, an apertured non-metallic washer between the supporting part and boss having an arcuate surface seating said boss, and means extending through said apertures adapted to secure the support structure to the vehicle supporting part, said pivotal connection accommodating swinging movement of said support structure whereby said apertures are aligned to receive said securing means.

WRAY C. HANSEN.